(12) United States Patent
Mathew

(10) Patent No.: US 6,918,169 B2
(45) Date of Patent: Jul. 19, 2005

(54) METHOD OF ASSEMBLING A VEHICLE

(75) Inventor: Boney A. Mathew, Clarkston, MI (US)

(73) Assignee: Mathson Industries, Clarkston, MI (US)

( * ) Notice: Subject to any disclaimer, the term of this patent is extended or adjusted under 35 U.S.C. 154(b) by 397 days.

(21) Appl. No.: 10/194,081

(22) Filed: Jul. 12, 2002

(65) Prior Publication Data
US 2003/0213114 A1 Nov. 20, 2003

Related U.S. Application Data

(60) Provisional application No. 60/378,084, filed on May 14, 2002, and provisional application No. 60/382,813, filed on May 23, 2002.

(51) Int. Cl.$^7$ ........................... B23P 25/00; B21D 39/03
(52) U.S. Cl. .............................. 29/458; 29/460; 29/430; 29/783; 29/791
(58) Field of Search ....................... 29/458, 460, 527.1, 29/897.2, 430, 783, 791

(56) References Cited

U.S. PATENT DOCUMENTS

| | | | |
|---|---|---|---|
| 2,757,447 A | | 8/1956 | Barenyl ........................ 29/430 |
| 3,968,559 A | | 7/1976 | Karlsson ....................... 29/430 |
| 4,261,615 A | | 4/1981 | Deaver ........................ 296/210 |
| 4,358,883 A | | 11/1982 | Gerring ...................... 29/401.1 |
| 4,438,971 A | | 3/1984 | Zaydel et al. ................ 296/191 |
| 4,444,705 A | * | 4/1984 | Kumasaka et al. ......... 264/46.5 |
| 4,553,309 A | * | 11/1985 | Hess et al. ..................... 29/450 |
| RE32,165 E | | 6/1986 | Gerring ...................... 29/401.1 |
| 4,683,651 A | | 8/1987 | Taketani et al. .............. 29/786 |
| 4,738,022 A | | 4/1988 | Sakamoto et al. ............ 29/712 |
| 4,759,489 A | * | 7/1988 | Pigott ......................... 228/102 |
| 4,767,046 A | | 8/1988 | Kumagai et al. ............ 228/4.1 |
| 4,991,282 A | | 2/1991 | Konig .......................... 29/407 |
| 5,090,105 A | | 2/1992 | DeRees ........................ 29/469 |
| 5,092,649 A | * | 3/1992 | Wurl ............................ 296/103 |
| 5,123,161 A | | 6/1992 | Kubo et al. ................... 29/784 |
| 5,456,002 A | * | 10/1995 | Barnhart et al. .............. 29/787 |
| 5,688,022 A | * | 11/1997 | Adams et al. .............. 296/214 |
| 6,003,936 A | | 12/1999 | Gordon ....................... 296/218 |
| 6,035,510 A | | 3/2000 | Amesbichler et al. ........ 29/434 |
| 6,120,091 A | | 9/2000 | Reich et al. ................ 296/214 |
| 6,135,535 A | | 10/2000 | Tarahomi .................... 296/102 |
| 6,324,749 B1 | | 12/2001 | Katsuura et al. .............. 29/703 |
| 6,334,252 B1 | | 1/2002 | Sato et al. .................. 29/897.2 |
| 6,347,829 B1 | | 2/2002 | Hanyu ........................ 296/210 |
| 6,408,516 B1 | * | 6/2002 | Taylor ........................ 29/897.2 |
| 6,470,559 B1 | * | 10/2002 | Spaulding et al. .......... 29/469.5 |
| 6,481,077 B1 | * | 11/2002 | Matsumoto et al. ........... 29/271 |
| 6,678,936 B2 | * | 1/2004 | Izumi et al. ................... 29/460 |
| 2002/0113464 A1 | * | 8/2002 | Wieschermann et al. ... 296/210 |
| 2003/0070272 A1 | * | 4/2003 | Zirbs ....................... 29/407.04 |

FOREIGN PATENT DOCUMENTS

| | | | | |
|---|---|---|---|---|
| EP | 170086 A2 | * | 2/1986 | ........... B60R/13/02 |
| JP | 04356290 A | * | 12/1992 | ........... B62D/65/00 |
| JP | 05162671 A | * | 6/1993 | ........... B62D/65/00 |
| WO | WO 99/16659 | * | 4/1999 | ........... B62D/29/04 |

* cited by examiner

Primary Examiner—David P. Bryant
(74) Attorney, Agent, or Firm—Howard & Howard

(57) ABSTRACT

A method of vehicle assembly (10) comprises the step (A) of fabricating a vehicle body (12) having a floor (14) and door (16) openings and roof pillars (18) defining window openings (20), and a roof (17) supported on the pillars (18) and defining a roof opening (22). The following step (B) includes placing the body (12) on a vehicle chassis (24) followed by the step (E) through (I) of inserting interior components (26) through the opening (22) in the roof (17) and securing the components (26) to the interior of the vehicle body (12). The final step (G) of the assembly includes placing a roof panel (38) on the roof (17) to close the opening (22) therein after the interior components (26) are inserted through the opening (22). The method (10) of vehicle assembly of the present invention will provide new, efficient, and economical method for assembling automotive vehicles that will reduce assembly time and will not be labor intensive.

18 Claims, 8 Drawing Sheets

METHOD OF ASSEMBLING A VEHICLE

This application claims the benefit of Provisional Application No. 60/378,084, now filed May 14, 2002, and claims the benefit of Ser. No. 60/382,813, now filed May 23, 2002.

BACKGROUND OF THE INVENTION

1. Field of the Invention

The subject invention relates to a method of assembling an automotive vehicle.

2. Description of the Prior Art

Numerous vehicle assembly lines, processes for assembling vehicles are known in the prior art and are widely used today in the automotive industry. U.S. Pat. No. 4,991,282 to Konig and U.S. Pat. No. 6,324,749 to Katsuura et al. disclose a variety of processes and methods for assembling motor vehicles.

The '282 patent to Konig shows a process for assembling vehicles having an integral body. The process includes the first step of mounting components and subassemblies on an assembly frame followed by the step of moving them into position relative to the body of the vehicle so that connections can be made between the vehicle body and the components and subassemblies. The body of the vehicle with the components and subassemblies are lifted off the assembly frame. The assembly frame disclosed in the process is easily adjustable to accommodate different types of vehicle bodies and positions the components and subassemblies in their proper position for connection to the vehicle body.

The '749 patent to Katsuura et al. shows vehicle assembly line comprising different zones for a vehicle assembly. The first zone of the assembly comprises a wire leading/transfer trimming zone wherein components for wire leading/transfer trimming are sequentially assembled to a paint-finished vehicle body for inspection. The next zone of the assembly comprises an interior zone wherein interior components are sequentially assembled for inspection and repairing. The interior zone is followed by an under-floor trimming zone wherein under-floor dress-up components are assembled for inspection and repair. The next zone of the process comprises an exterior zone wherein exterior components are assembled for inspection. The process of assembling disclosed in the '749 patent to Katsuura et al. provides for method of repairing and eliminating defects in each zone of the assembly process.

However, one of the areas of continuous development and research is the area of a more advanced method of installing and assembling parts of the vehicle that is efficient, easy to use and reduce assembly time.

BRIEF SUMMARY OF INVENTION

A method of vehicle assembly comprises the steps of fabricating a vehicle body having a body with floor and door openings and roof pillars defining window openings and a roof supported on the pillars and defining a roof opening. The method includes placing the body on a vehicle chassis followed by inserting interior components through the opening in the roof and securing the components to the interior of the vehicle body. As a matter of closure, a roof panel is placed on the roof to close the opening therein after the interior components are inserted through the opening.

One of the advantages of the present invention is a possibility for the workers to assemble the vehicles without any inherent problems of a cramped and hectic working area. Still another advantage of the present invention is the potential reduction in cost of labor and workers compensation due to less labor required in the assembly process. Furthermore, in the method shown in the present invention, all interior and exterior components including and not limited to roof racks, skid racks, clocks, radios, sunroof, speakers, antenna farms, decorative lining, and etc. could be assembled into the roof panel with ease at the outsourced assembly area. Thus, a completely assembled roof panel of the vehicle could be attached to the vehicle body at the last sequential step when all interior components had been installed in the assembly line.

Therefore, the method shown in the present invention is new, efficient, and will provide an economical way of assembling vehicles that will help to reduce assembly time and not be labor intensive.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
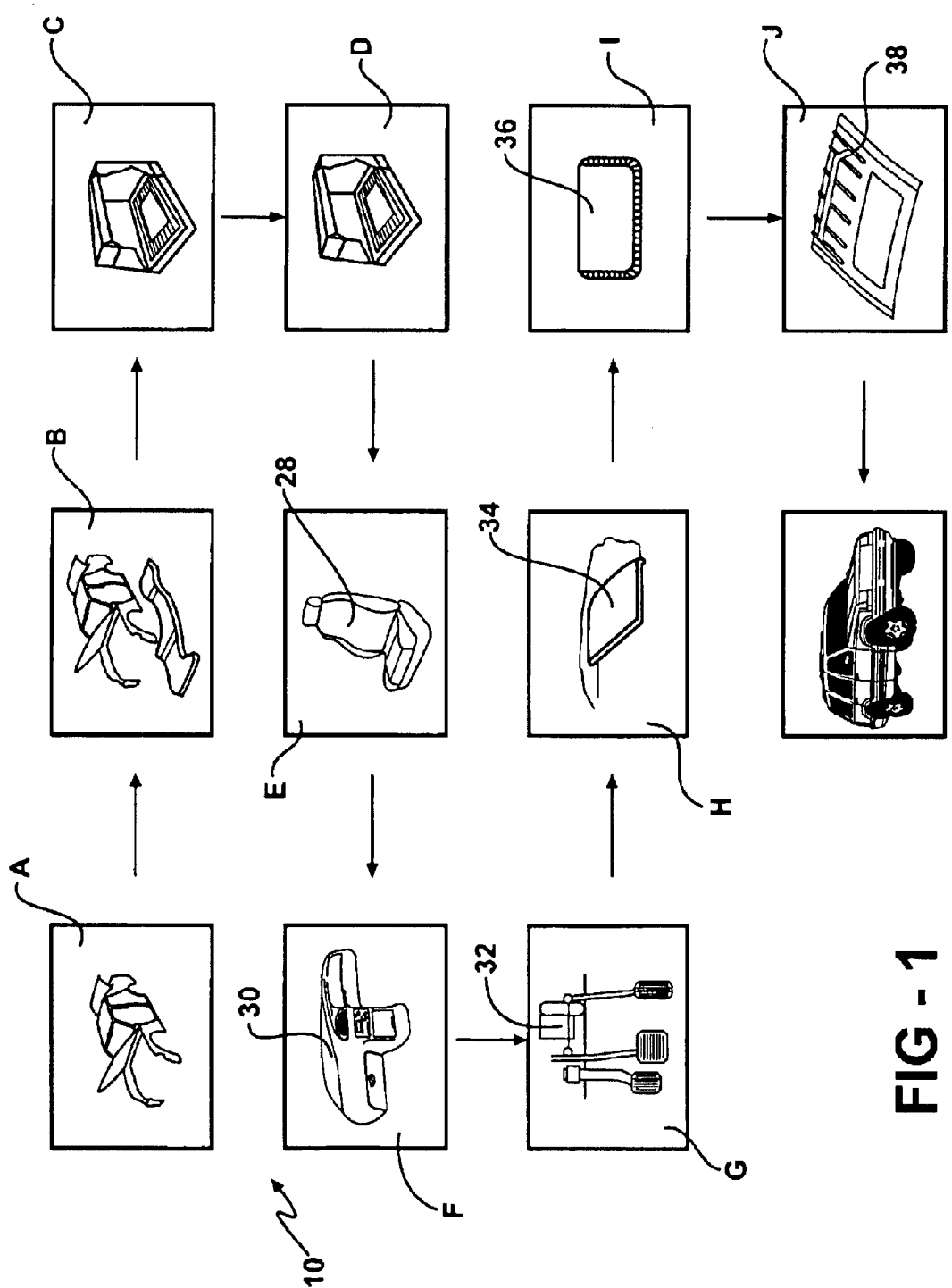
FIG. 1 is a schematic view of an improved method for assembly of the vehicles.
Figure 2:
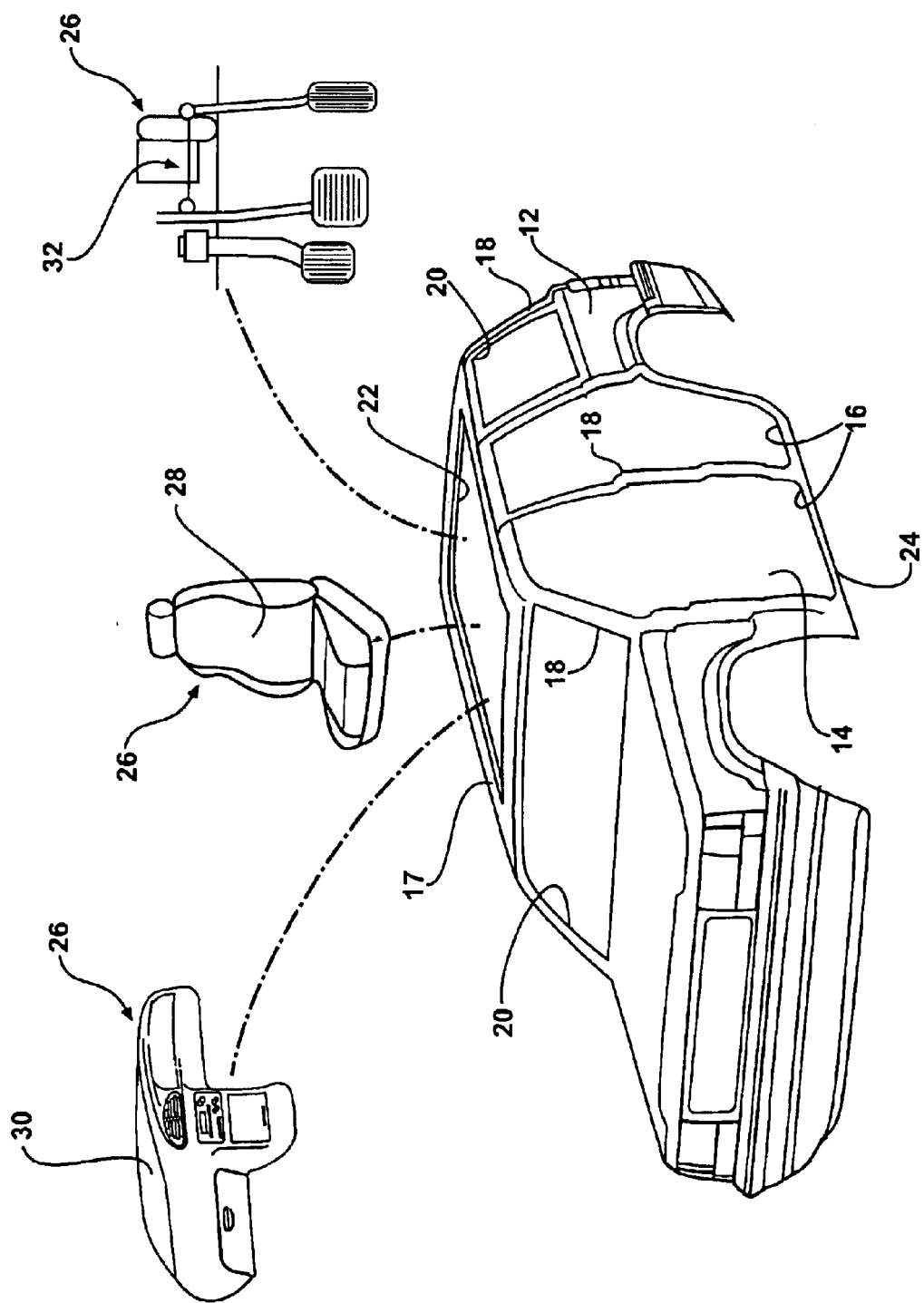
FIG. 2 is a schematic view showing assembly of interior components through the roof opening.
Figure 3:
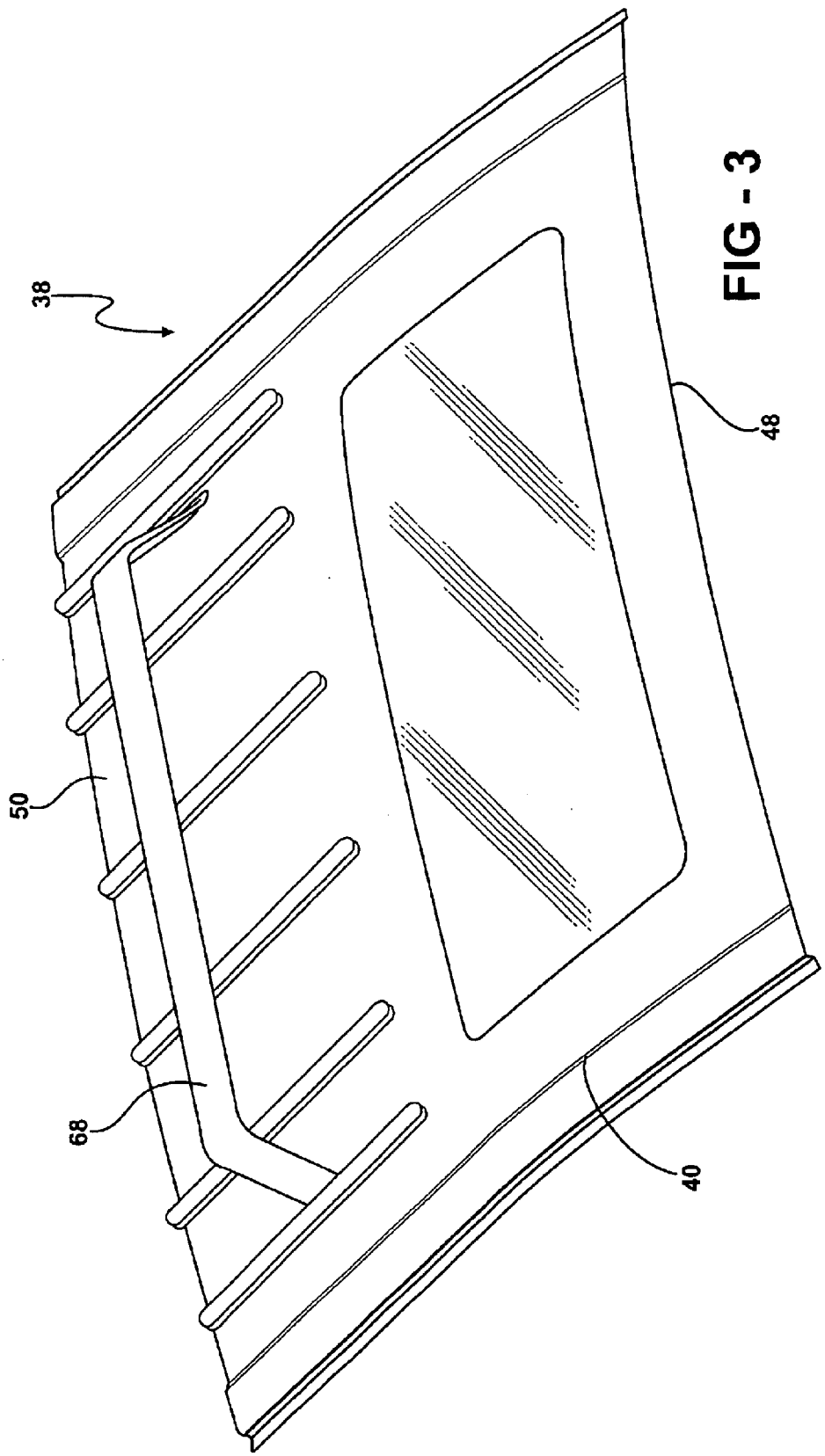
FIG. 3 is a perspective view of a roof panel.
Figure 4:
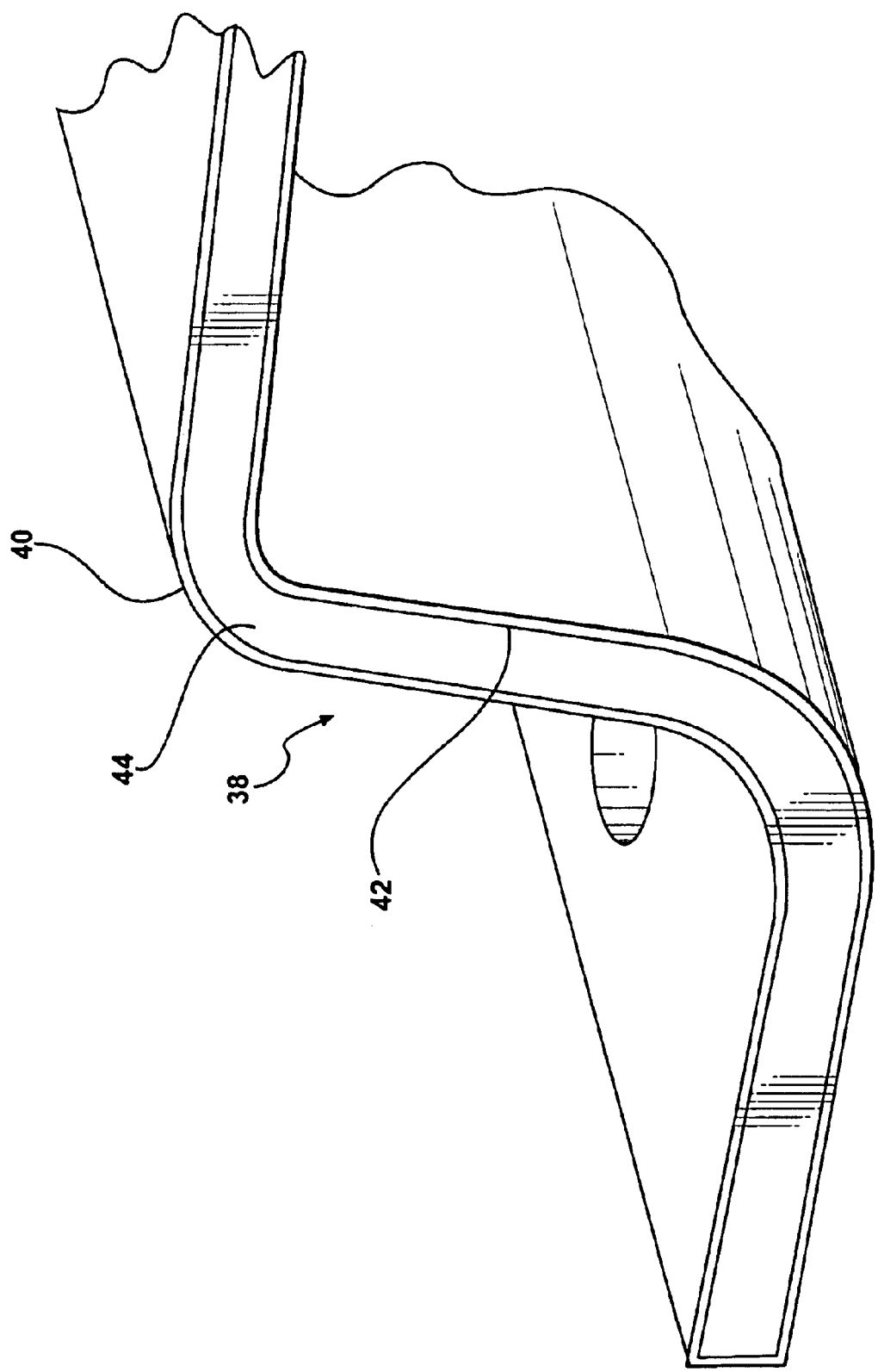
FIG. 4 is a cross-sectional perspective view of the roof panel.
Figure 5:
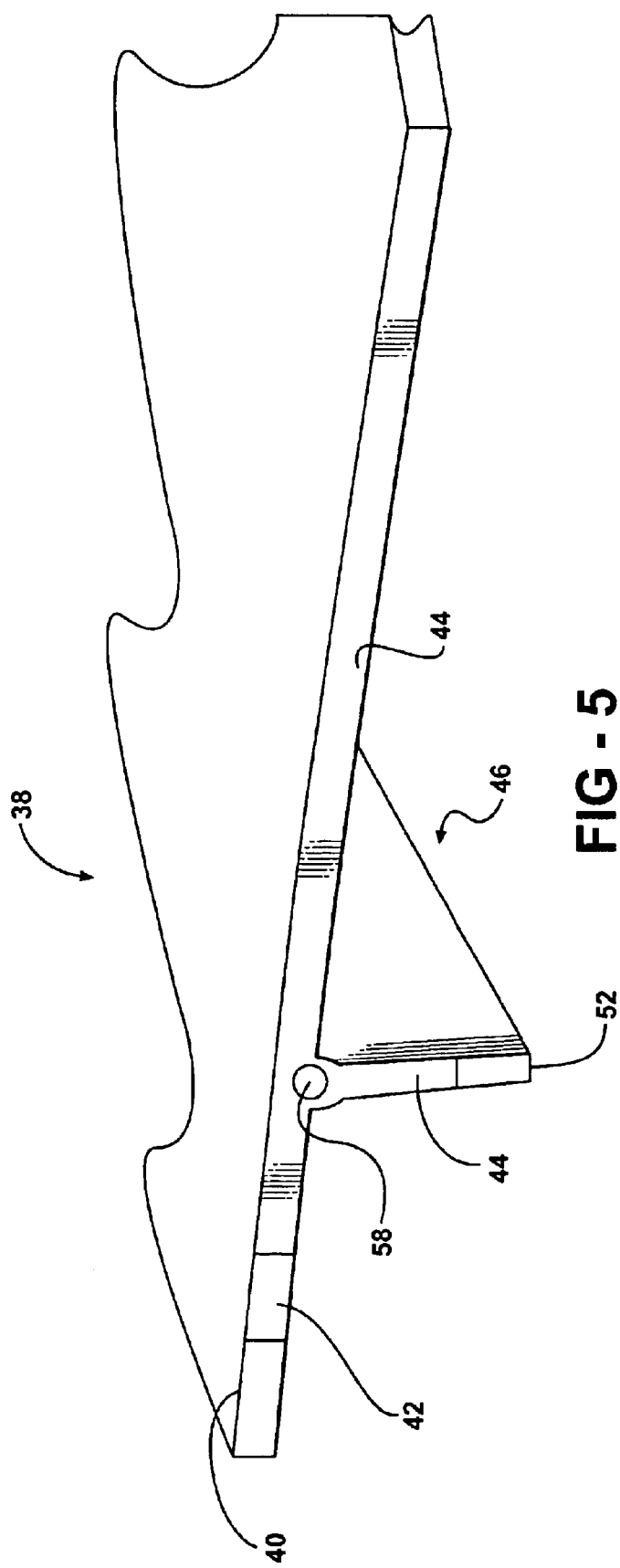
FIG. 5 is a cross-sectional perspective view of the roof panel with integrally molded reinforcing rib extending from a bottom of the roof panel.
Figure 6:
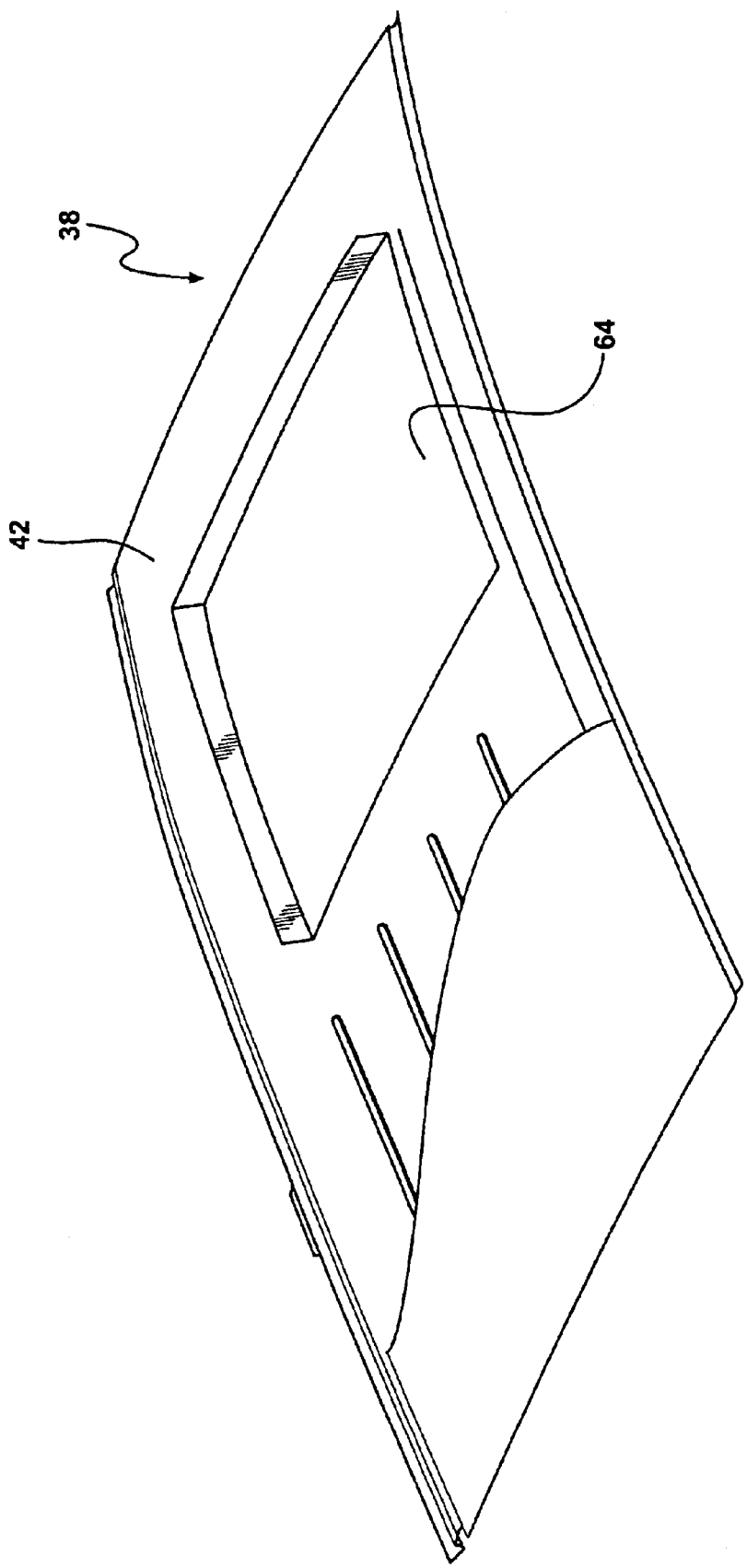
FIGS. 6 and 7 show interior components attached to the bottom of the roof panel.
Figure 7:
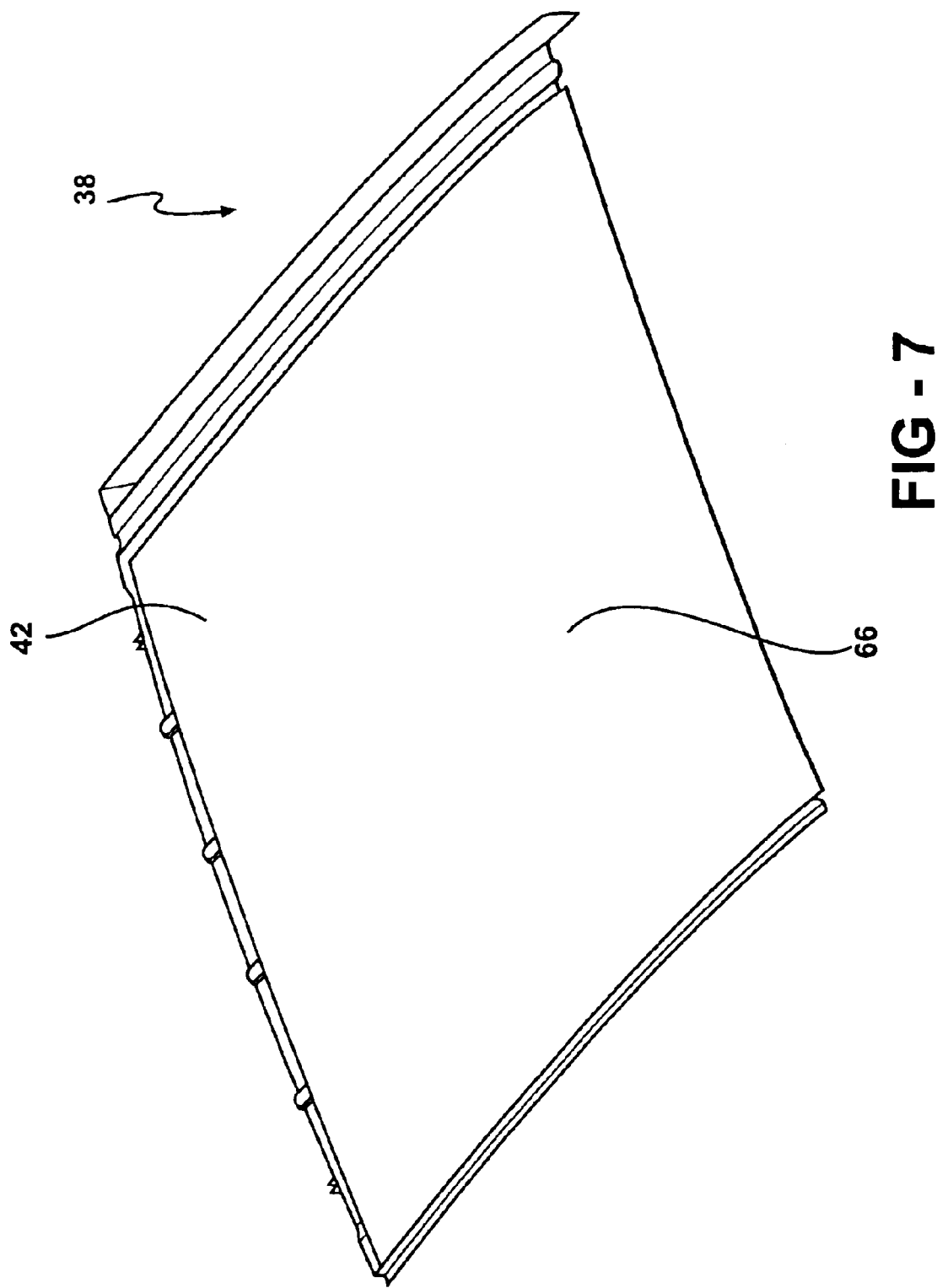

Referring to the FIGS. 1 through 8, wherein like numerals indicate like or corresponding parts throughout the several views, a method of assembling a vehicle is generally shown at 10.

A method of assembling a vehicle 10 comprises plurality of sequential steps wherein the first step A of the method 10 includes fabricating a vehicle body 12 having a floor 14 and door 16 openings and roof pillars 18 defining window openings 20 and a roof 17 supported on the pillars 18 and defining a roof opening 22. The next step B includes placing the body 12 on a vehicle chassis 24. When the body 12 of the vehicle is placed and secured on the vehicle chassis 24, the body of the vehicle 12 is transferred to the next location wherein doors are attached to the body of the vehicle 12 to close the door openings 16 prior to inserting interior components, generally indicated at 26, through the roof opening 22.

The next step C is called E-Coating. This step C includes a coating of a bottom portion of the body 12 floor with an epoxy to provide high corrosion and chip resistance and a coating of the body 12 of the vehicle, also known as coating with electrophoretic paint, EDP or electrodeposited paint. The process of E-Coating is widely specified by automotive manufacturers for body and under body corrosion protection on steel componentry because this process may help preserve the underlying material by improving its resistance to environmental degradation including corrosion, erosion and the like.

Upon completion of E-Coating process of the vehicle body 12 the next step D of the method 10 includes painting the vehicle body 12 prior to assembly of the interior components wherein the body of the vehicle 12 is run through painting booth of the assembly line.

The step of inserting the interior components 26 follows the step D of painting the vehicle body 12. Since the roof 17, supported on the pillars 18 defines the opening 22, the next step of the method 10 includes inserting the interior components 26 through the opening 22 in the roof 17 and securing the components 26 to the interior of the vehicle body 12. The step E includes inserting seats 28 through the roof opening 22 wherein the seats 28 are mounted to a bottom of the vehicle chassis 24. When the seats 28 are installed the next step F includes inserting an instrument panel 30 through the roof opening 22 upon completion of which pedal assembly 32 is inserted through the roof opening 22 and installed inside the vehicle body 12 in the step G. When the pedal assembly 32 had been installed the next step H includes inserting of a side lining 34 followed by the step I including inserting floor mats 36 through the roof opening 22.

The next step J of the method 10 includes placing the roof panel, generally shown at 38, onto the roof opening 22 of the vehicle 12. The roof panel 38 is formed from injection molded organic polymeric material. The roof panel 38 includes outer 40 and inner 42 skins of the panel 38, and a reinforcing layer 44 that comprises foamed plastic, glass fibers, minerals, aramid fibers, or combination thereof. The reinforcing layer 44 is sandwiched between the outer 40 and inner 42 skins of the roof panel 38. In the alternative embodiment the roof panel 38 may be fabricated as a solid, non-reinforced with foamed plastic, glass fibers, minerals, aramid fibers, or combination thereof, plastic body.

The roof panel 38 comprises at least one or more reinforcing ribs, generally shown at 46, adjacent and spaced from one another and extending integrally from the inner skin 42 longitudinally between front 48 and rear 50 ends of the roof panel 38. The rib 46 is tapered towards the rib's distal end 52 to form a difference between the width of the roof panel 38 and the width of the rib 46 that provides for easy ejection of the roof panel 38 from the mold 54. Based on the size of the vehicle, the roof panel 38 may comprise no ribs 46.

There are several alternatives to mold the roof panel 38 for the vehicle. The first embodiment the roof panel 38 is received by injecting a heated organic polymeric material under pressure into a mold, generally indicated at 54. In the alternative embodiment a gas injection molding may be used. In that embodiment, N2 gas or chemical blowing agents combined with plastic pellets are injected into a cavity 56 of the mold 54 wherein the cavity 56 is not completely filled with heated organic polymeric material. The material will be pushed along entire inner surface of the cavity 56 and will be packed thereon by N2 gas or chemical blowing agents supplied from the inside of the mold 54. The gas injection may also form plastic parts having a cavity 58 or hollow portion 58 therein to reduce sink marks and provide Class A finish of the outer skin 40 of the roof panel 38.

The method 10 of the present invention comprises several alternative embodiments to receive a colored appearance of the roof panel 38. One embodiment comprises the step of adding a dye or pigment to the organic polymeric material before injecting the material into the mold 54 for achieving a colored appearance of the roof panel 38.

Figure 8:
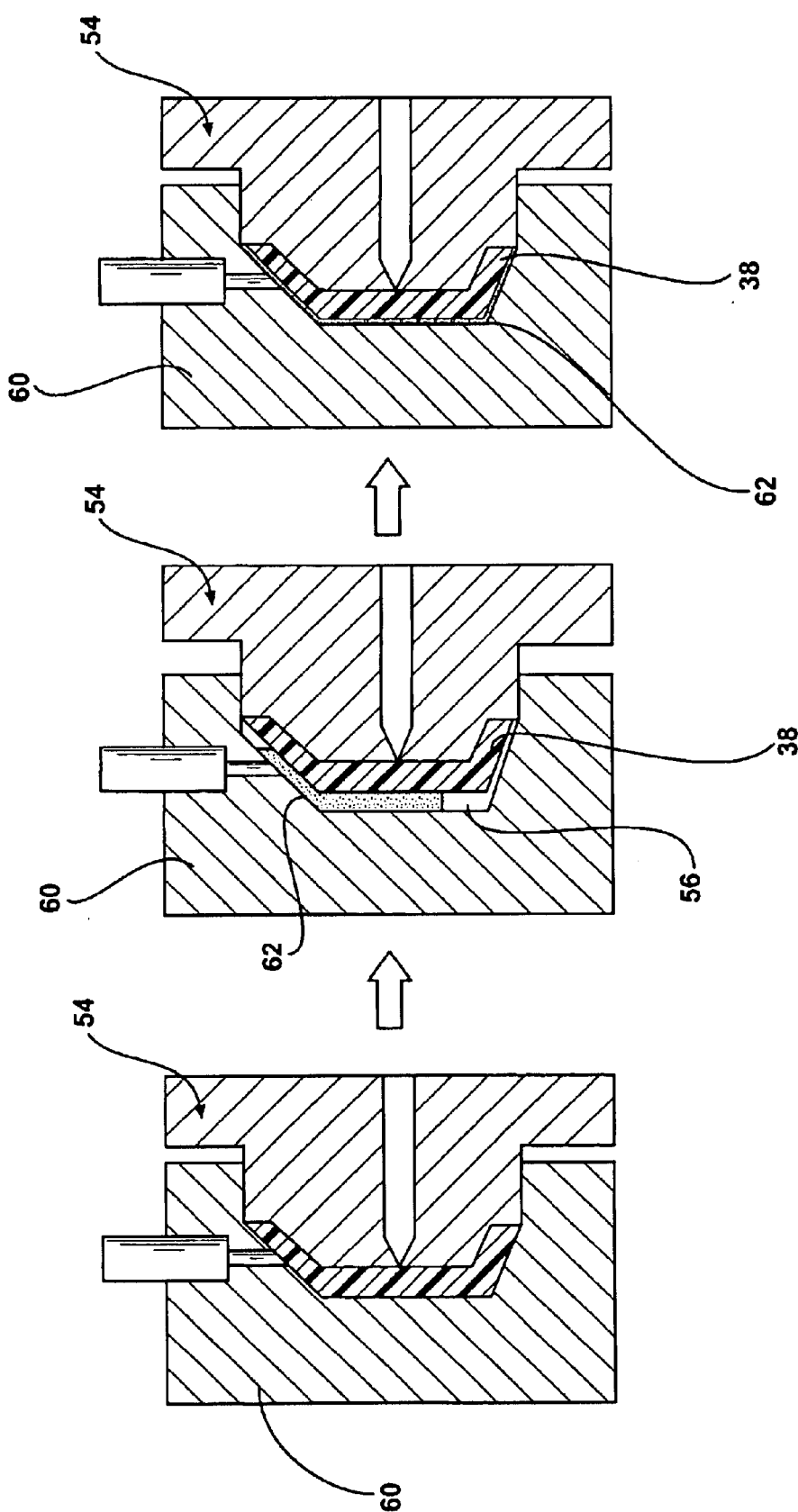
FIG. 8 is a schematic view of the in-mold painting process.

Another alternative embodiment includes in-mold painting, shown in FIG. 8, which allows shorter cycle times and reduces processing costs compare to other method of coating of plastic parts used in the industry. The in-mold painting begins with injecting of the organic polymeric material into the mold 54. When the roof panel 38 is formed, one part 60 of the mold 54 is slightly opened to receive the paint 62 therein. The paint 62 is injected in to the mold 54 on top of the cured roof panel 38 upon which the mold 54 is closed to spread the paint 62 across the outer skin 40 of the roof panel 38.

In the other alternative embodiment a paint is applied directly to the outer 40 and inner 42 skins of already molded roof panel 38 wherein the roof panel 38 with the paint applied thereon is cured.

When the roof panel 38 is cooled a plurality of interior and exterior components are attached onto the roof panel 38 prior to placing the roof panel 38 on the roof 17. The interior components include clocks, radios, speakers, antenna farms 64, decorative lining 66, headliners and etc. The exterior components include roof racks 68, skid racks, sun roof, and the like.

The advantages of the present invention can be readily appreciated by comparing the method of assembling the vehicle of the present invention with the method of assembling the vehicles currently used in the automotive industry that tends to be labor intensive, cost effective and uncomfortable because all interior components including the seats, the instrument panel, the pedal assembly, the interior lining, the floor mats, clocks, radios, speakers, antenna farms, decorative lining, headliners and etc. are installed through the door opening before the vehicle is ready to leave the assembly line.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A method of assembling a vehicle (10) comprising the steps of:
    fabricating a vehicle body (12) having a floor (14) and door (16) openings and roof pillars (18) defining window openings (20) and a roof (17) supported on the pillars (18) and defining a roof opening (22);
    placing the body (12) on a vehicle chassis (24);
    inserting interior components (26) through the opening (22) in the roof (17) and securing the components (26) to the interior of the vehicle body (12);
    placing a roof panel (38) on the roof (17) to close the opening (22) therein after the interior components (26) are inserted through the opening (22).

2. A method (10) as set forth in claim 1 further including the step of attaching doors to the body (12) to close the door openings (16) prior to inserting interior components (26) through the roof opening (22).

3. A method (10) as set forth in claim 2 wherein the step of inserting of interior components (26) is further defined as inserting seats (28) through the roof opening (22).

4. A method (10) as set forth in claim 2 wherein the inserting of interior components (26) is further defined as inserting an instrument panel (30) through the roof opening (22).

5. A method (10) as set forth in claim 2 wherein the inserting of interior components (26) is further defined as inserting pedals (32) through the roof opening (22).

6. A method (10) as set forth in claim 2 wherein the inserting of interior components (26) is further defined as inserting floor mats (36) and a side lining (34) through the roof opening (22).

7. A method (10) as set forth in claim 1 further including the step of coating (C) of the bottom of the body floor with an epoxy to provide high corrosion and chip resistance.

8. A method (10) as set forth in claim 1 further including the step of painting (D) the vehicle body (12) prior to assembly of the interior components (26).

9. A method (10) as set forth in claim 1 wherein the step of placing the panel (38) onto the roof (17) is further defined as molding a roof panel (38) of organic polymeric material.

10. A method (10) as set forth in claim 9 wherein the step of molding the roof panel (38) is further defined as adding a dye or pigment to the organic polymeric material before injecting the material into a mold (54) for achieving a colored appearance of the roof panel (38).

11. A method (10) as set forth in claim 9 wherein the step of molding the roof panel (38) is further defined as curing the organic polymeric material in the mold (54) and injecting a coating (62) on top of the cured roof panel (38) in the mold (54) and spreading the coating across the outer skin (40) of the roof panel (38).

12. A method (10) as set forth in claim 9 wherein the step of placing the roof panel (38) is further defined as fabricating the roof panel (38) outer (40) and inner (42) skins and a reinforcing layer (44) sandwiched between the outer (40) and inner (42) skins of the roof panel (38).

13. A method (10) as set forth in claim 12 wherein the step of molding the roof panel (38) is further defined as injecting a foam between the outer (40) and inner (42) skins of the roof panel (38) to reduce sink marks and receive class A finish.

14. A method (10) as set forth in claim 12 wherein the step of molding the roof panel (38) is further defined as using chemical blowing agent when molding to reduce sink marks and receive class A finish.

15. A method (10) as set forth in claim 12 wherein the step of molding the roof panel (38) is further defined as using gas injection molding to reduce sink marks and receive class A finish.

16. A method (10) as set forth in claim 15 wherein the step of molding the roof panel (38) is further defined as molding at least one reinforcing rib (46) adjacent and spaced from one another and extending integrally from the inner skin (42) longitudinally between the front (48) and rear (50) ends of the roof panel (38).

17. A method (10) as set forth in claim 1 including attaching exterior components onto the roof panel (38) prior to placing the roof panel (38) on the roof.

18. A method (10) as set forth in claim 1 including attaching interior components onto the roof panel (38) prior to placing the roof panel (38) on the roof (17).

* * * * *